United States Patent [19]

Baugher et al.

[11] Patent Number: 4,466,531

[45] Date of Patent: Aug. 21, 1984

[54] APPARATUS FOR MAKING ELASTOMERIC FABRIC

[75] Inventors: Robert C. Baugher, Tallmadge; Ralph F. Kiemer; Raymond R. Smith, Jr., both of Akron, all of Ohio

[73] Assignee: The Steelastic Company, Akron, Ohio

[21] Appl. No.: 387,485

[22] Filed: Jun. 11, 1982

[51] Int. Cl.$^3$ .............................................. B65G 25/00
[52] U.S. Cl. .................................... 198/486; 198/689; 414/752
[58] Field of Search ............... 198/486, 689, 339, 457; 414/71, 72, 752, 751, 121, 627; 242/93, 95, 158; 156/405 P

[56] References Cited

U.S. PATENT DOCUMENTS

| | | | |
|---|---|---|---|
| 3,433,690 | 3/1969 | Barns | 156/157 |
| 3,607,576 | 9/1971 | Phillips | 156/507 |
| 3,803,965 | 4/1974 | Alderfer | 83/155 |
| 3,858,711 | 1/1975 | Barker | 198/627 X |
| 3,888,717 | 6/1975 | Koyama et al. | 156/351 |
| 3,962,022 | 6/1976 | Bottasso et al. | 156/507 |
| 4,087,308 | 5/1978 | Baugher et al. | 156/405 R |
| 4,274,801 | 6/1981 | Herb et al. | 414/751 |

Primary Examiner—Joseph E. Valenza
Assistant Examiner—Dennis J. Williamson
Attorney, Agent, or Firm—Renner, Kenner, Greive & Bobak

[57] ABSTRACT

A transfer mechanism (20) for moving elastomeric ribbon between a first or lead-in mechanism, and a second or assembly mechanism of a ply fabrication apparatus (21) includes a shuttle means (35) for selectively engaging the ribbon, first movement means (36) for translating the shuttle (40) upwardly and downwardly with respect to the first and second mechanisms, and second movement means (38) for translation of the shuttle between the first and second mechanisms. The shuttle means includes a movable shuttle (40). The first movement means (36) includes a first support (41) rigidly attached to the apparatus (21), and a second support (45) for mounting the shuttle (40) and having an overall length less than the length of the shuttle. The first movement means also includes rack and gear means (60 and 56) carried by one of the supports (41, 45) and actuating means (46) which drives a gear (56) against a rack (60) thereby moving one of the supports (41, 45) toward and away from the other support (41, 45) in continuous parallel alignment. The shuttle of the transfer mechanism can be protracted from the first mechanism to the second mechanism without direct support over the second mechanism. An alternate first movement means (165) is provided which employs a pair of ball screws (166) for moving one support (41, 45) toward and away from the other support (41, 45). The ball screws (166) are rotated by a belt (185) which is, in turn, driven by a cylinder (186).

15 Claims, 16 Drawing Figures

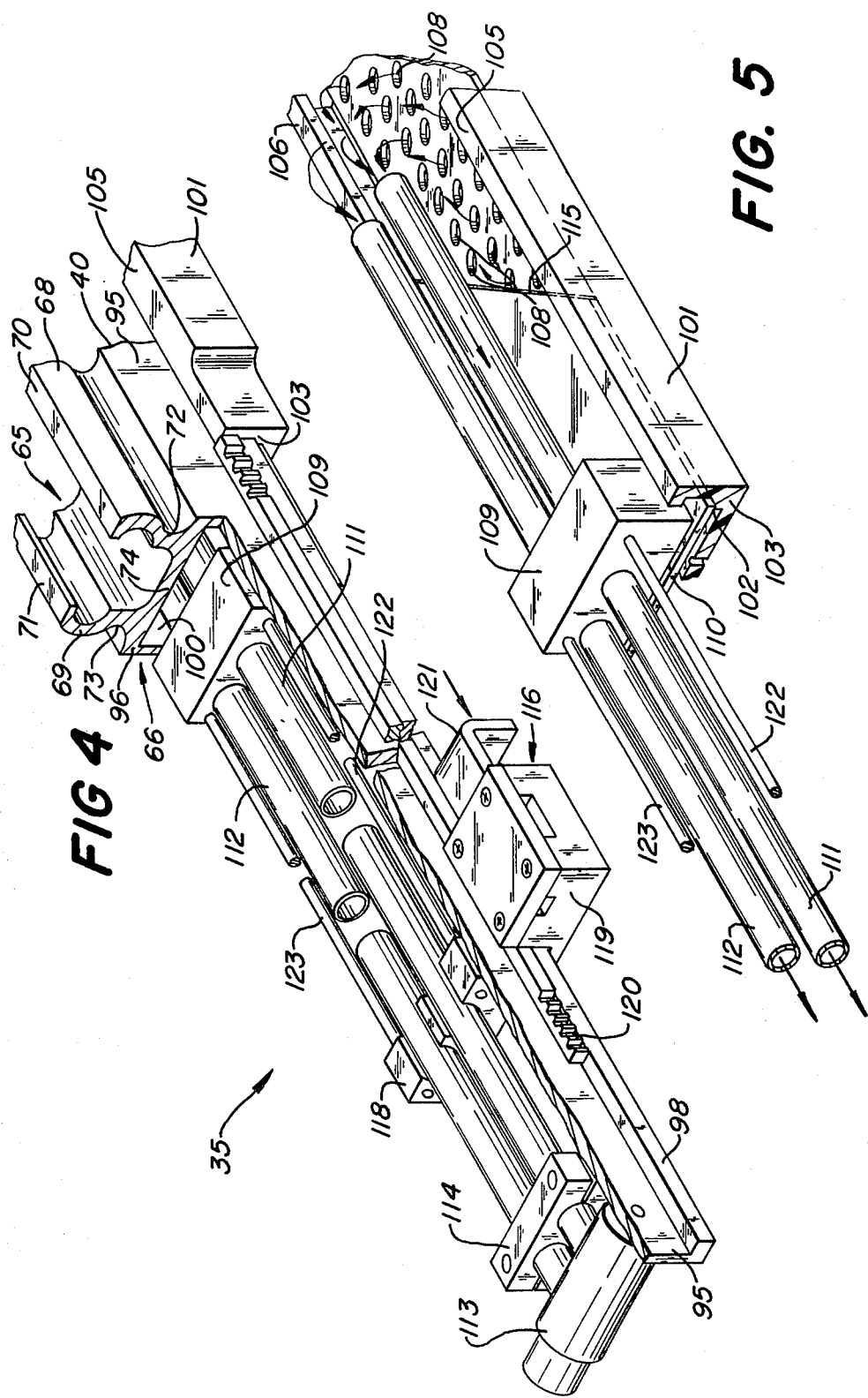

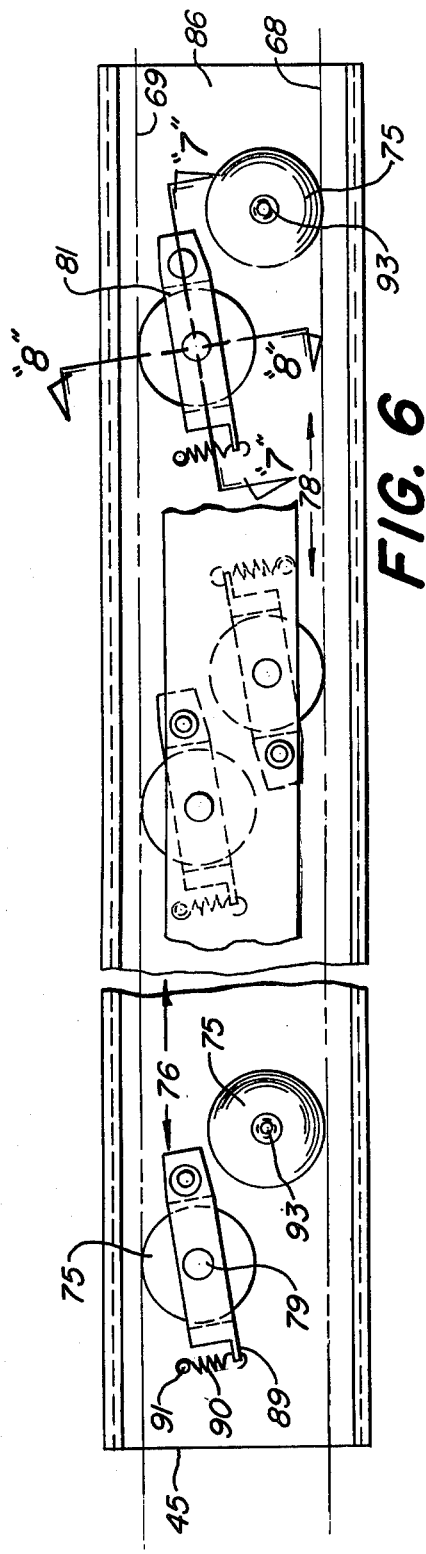
FIG. 6
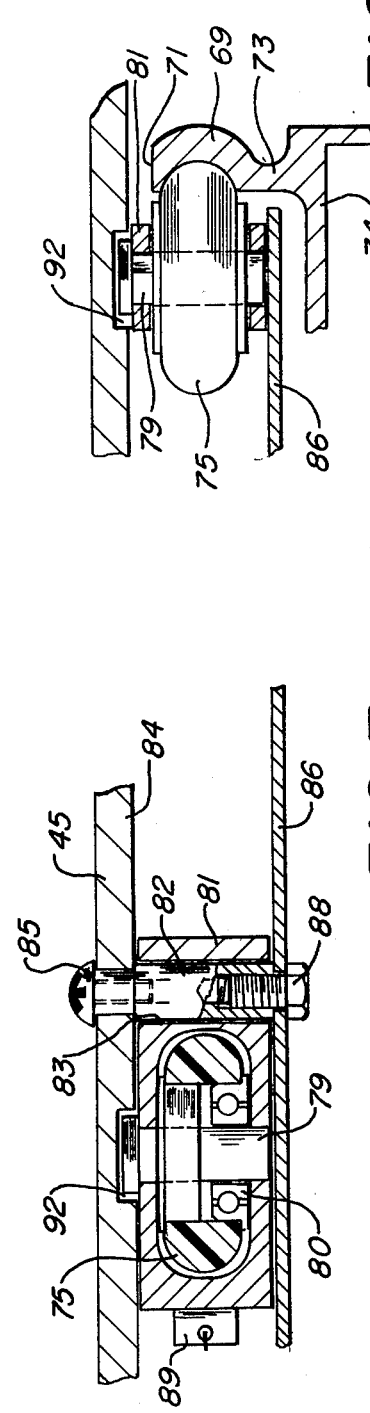
FIG. 8
FIG. 7

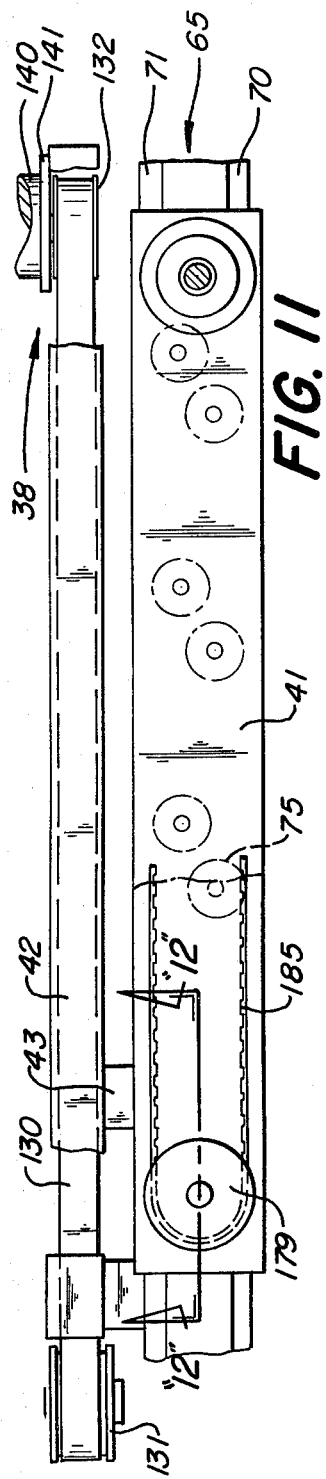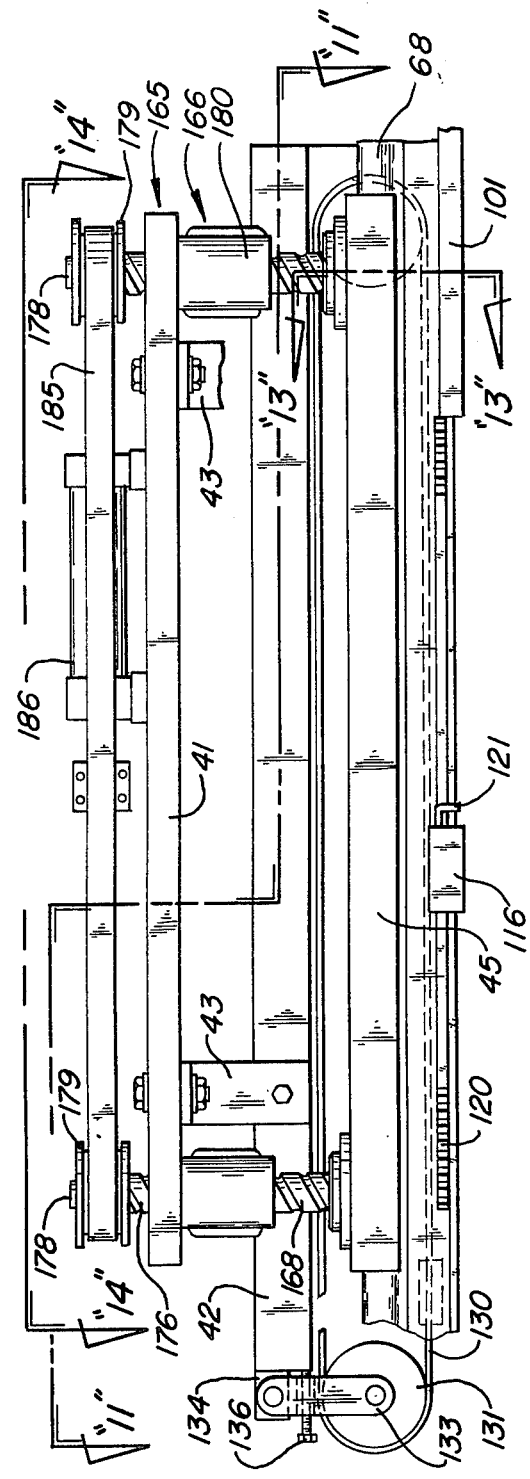

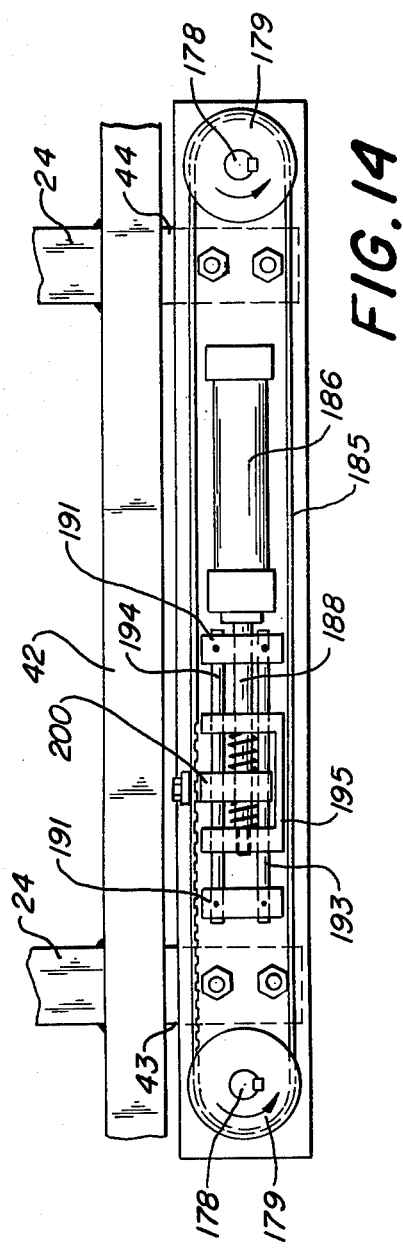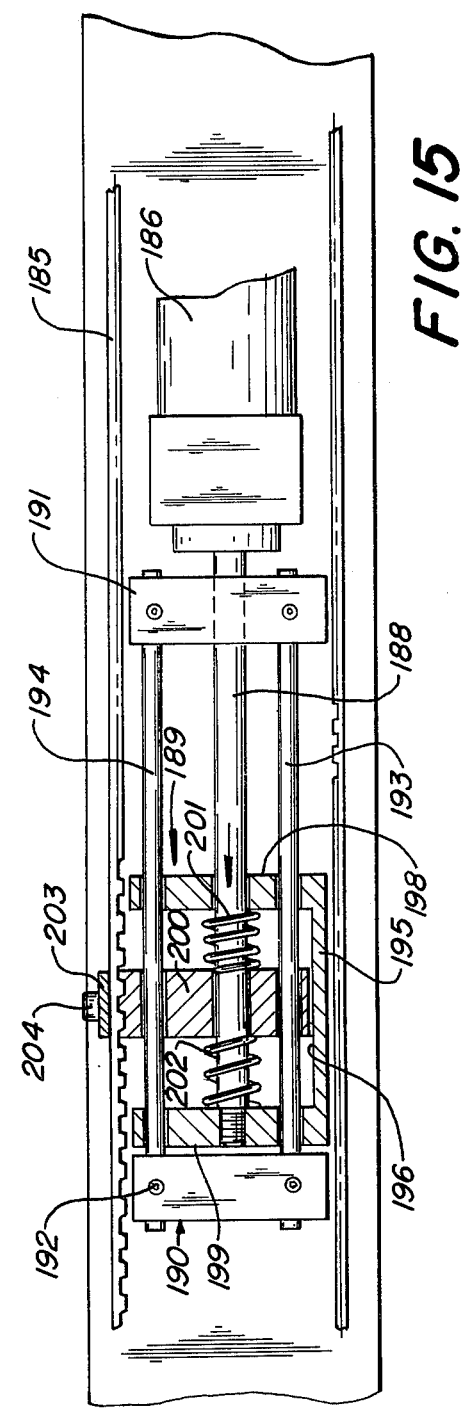

APPARATUS FOR MAKING ELASTOMERIC FABRIC

TECHNICAL FIELD

The present invention relates generally to an apparatus for the manufacture of reinforced elastomeric fabrics which are used to manufacture a variety of goods including tires, power drive belts, reinforced hose and containers such as fuel cells. More specifically the present invention pertains to an improved material transfer mechanism for use with such apparatus.

BACKGROUND ART

In order to construct bias belted and radial tires it is necessary to manufacture reinforced fabric which has its reinforcing cords angularly or perpendicularly inclined with respect to a circumferential reference plane of the tire. As disclosed in U.S. Pat. No. 4,087,965, which patent is owned by our common assignee, The Steelastic Company, reinforced tire fabric for radial tires can be manufactured by feeding a continuous ribbon of elastomeric material, having reinforcing cords oriented parallel to the length of the ribbon, past a cutting mechanism and onto an assembly table at a predetermined angle with respect to the cutting mechanism; severing a strip of predetermined length from the ribbon; and manipulating the strip so as to affix it to the precedingly deposited strip.

The apparatus, disclosed in the above patent, solved many of the problems associated with the construction of reinforced tire fabric by known methods such as calendaring. Although the previous apparatus has successfully accomplished the efficient construction of reinforced tire fabric, the transfer mechanism of the apparatus, which served to engage the ribbon, carry it past the cutting mechanism and precisely deposit it upon the assembly table, required the manufacture, assembly and operation of a mechanism having numerous interacting components.

While the earlier transfer mechanism has functioned reliably and in a satisfactory manner, it has done so with numerous interacting components, particularly pneumatic cylinders and limit switches. Each of these increases the expense of manufacture, assembly and maintenance and thus, a need has been perceived to simplify the transfer mechanism of the apparatus in order to decrease the foregoing expenses as well as increase the efficiency and the speed of the transfer mechanism.

DISCLOSURE OF THE INVENTION

It is therefore an object of the present invention to provide an improved transfer mechanism for an apparatus for producing reinforced fabric, from elemental strips of reinforced ribbon, having fewer component parts than existing transfer mechanisms.

It is another object of the present invention to provide an improved transfer mechanism for an apparatus for producing reinforced fabric from elemental strips of reinforced ribbon by providing a mechanism that is easier to manufacture, assemble and maintain than previous transfer mechanisms.

It is still another object of the present invention to provide an improved transfer mechanism for an apparatus for producing reinforced fabric from elemental strips of reinforced ribbon, which is more rigid and durable than existing mechanisms of greater complexity.

It is yet another object of the present invention to provide an improved transfer mechanism for an apparatus for producing reinforced fabric from elemental strips of reinforced ribbon that is more efficient in the utilization of material and in operation than previous transfer mechanisms.

It is a further object of the present invention to provide an improved transfer mechanism for an apparatus for producing reinforced fabric from elemental strips of reinforced ribbon that operates with greater accuracy and greater speed than previous transfer mechanisms.

These and other objects, together with the advantages thereof over existing and prior art forms, which will become apparent from the following specification are accomplished by means hereinafter described and claimed.

In general, the transfer mechanism of the present invention moves elastomeric ribbon between a first or lead-in mechanism, and a second or assembly mechanism of a ply fabrication apparatus and includes a shuttle means for selectively engaging the ribbon, first movement means for translating the shuttle upwardly and downwardly with respect to the first and second mechanisms, and second movement means for translation of the shuttle between the first and second mechanisms.

The shuttle means includes a raceway presenting opposed flanges and a channel projecting downwardly from the raceway, the raceway and channel defining a movable shuttle. The first movement means is located over one of the two positions on the apparatus and includes first support means rigidly attached to the apparatus, and second support means for mounting the shuttle and having an overall length less than the length of the shuttle. Roller means are rotatably carried by the second support means and engage the opposed flanges of the raceway for parallel protraction and retraction of the shuttle therealong whereby the shuttle can be protracted from the first mechanism to the second mechanism without direct support over the second mechanism.

The first movement means further includes first rod means and actuating means for moving the first rod means, one end of the first rod means being connected to one of the support means, the actuating means being connected to the other of the support means, and the other end of the first rod means being movable with respect to the other of the support means, to which the actuating means is connected. First intermeshing rack and gear means are provided and are connected to one end of the first rod means and a shaft is rotatably connected to the first gear means. Second intermeshing rack and gear means are also provided, said second gear means being affixed on the shaft and rotatable therewith. A second rod means is connected to the second rack and gear means at one end and, at the other end, to the support means to which the first rod means is connected whereby the first and second rod means are protracted and retracted in unison to move one of the support means toward and away from the other of the support means in continuous parallel alignment therewith.

A second embodiment of a transfer mechanism is also set forth in the present invention. The second mechanism functions with a ply fabrication as does the first mechanism and employs the same shuttle means and second movement means. The shuttle of both transfer mechanisms employs air to pick up and transfer the elastomeric ribbon although other means could be substituted. The first movement means is also located over one of the two positions on the apparatus and includes first and second support means and roller means rotatably carried by the second support means and engaging the opposed flanges of the raceway.

The first movement means thereafter differs from its earlier counterpart and includes a pair of ball screws, each having a housing affixed to one of the support means and a screw affixed to the other of the support means, a pulley keyed to each screw, a belt reeved around the pulleys, and means for incrementally driving the belt whereby the ball screws are rotated sufficiently against their housings that one of the support means is protracted and retracted relative to the other support means, so that the first and second support means remain parallel to each other at all times.

Two alternative embodiments are shown by way of example in the accompanying drawings and described in detail without attempting to show all of the various forms and modifications in which the invention might be embodied; the invention being measured by the appended claims and not by the details of the specification.

BRIEF DESCRIPTION OF THE DRAWINGS

FIG. 2A is top plan view depicting the motor employed to drive the reciprocating means;

FIG. 4 is an exploded perspective depicting the shuttle mechanism of the present invention;

FIG. 5 is perspective of a partial assembly of the shuttle mechanism depicted in FIG. 4 showing the structural configuration of the interior of the shuttle;

FIG. 6 is a bottom plan view of a portion of the shuttle support mechanism;

FIG. 7 is a longitudinal cross-sectional view of a roller from the shuttle support mechanism taken substantially along line 7—7 of FIG. 6;

FIG. 8 is a lateral cross-sectional view depicting a roller and mating race of the shuttle taken substantially along line 8—8 of FIG. 6;

FIG. 10 is a frontal elevation, with parts broken away for clarity, depicting the embodiment of the transfer mechanism of FIG. 9;

FIG. 11 is a top plan view of the transfer mechanism of FIG. 9 with parts broken away for clarity taken substantially alone line 11—11 of FIG. 10;

FIG. 14 is a top plan view of the transfer mechanism of FIG. 9 depicting the actuating mechanism; and FIG. 15 is an enlarged partial view of FIG. 14.

PREFERRED EMBODIMENT FOR CARRYING OUT THE INVENTION

Figure 1:
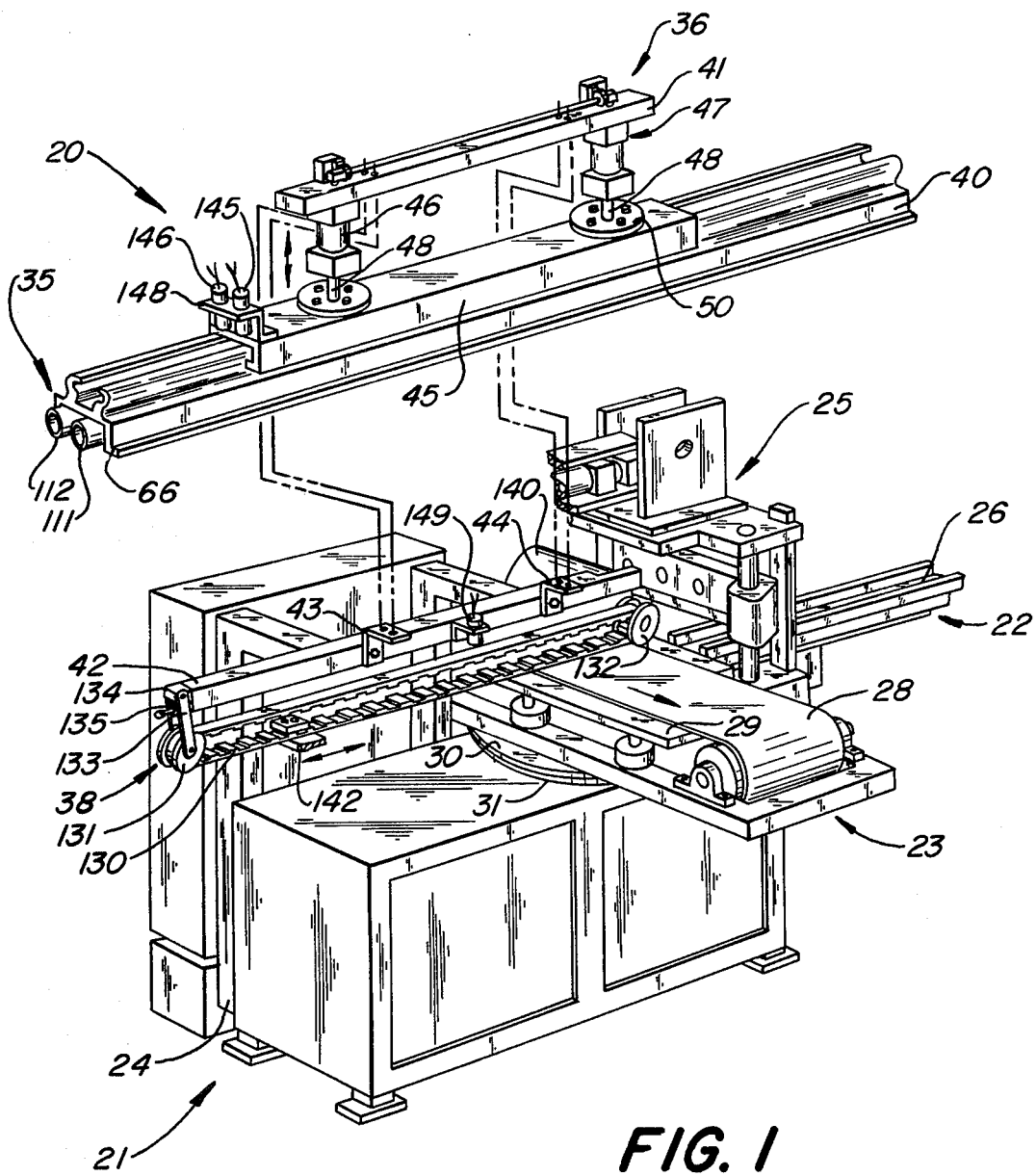
FIG. 1 is an exploded perspective of the main components of the transfer mechanism embodying the concept of the present invention and is depicted with a lead-in mechanism and assembly mechanism of an apparatus for making reinforced sheets from reinforced elastomeric ribbon.

The transfer mechanism embodying the concept of the present invention is designated generally by the numeral 20 on the attached drawings. It is depicted with an apparatus 21 for making sheets of reinforced elastomeric fabric from thin strips or ribbon. The apparatus includes a first mechanism or lead-in mechanism 22, a second mechanism or assembly mechanism 23, a frame 24 and a guillotine mechanism 25 (not totally shown for clarity). The lead-in or first mechanism 22 includes the use of an input table 26 for accurately positioning a ribbon of reinforced elastomeric material. The input table 26 is channel-shaped to guide the ribbon and is positioned to align with the shuttle of the transfer mechanism 20.

The assembly or second mechanism 23 comprises a conveyor belt 28 and support plate 29. The belt is incrementally rotated or indexed a predetermined distance by a stepper motor (not shown) to allow the deposition of successive segments of ribbon which are spliced together to form a continuous sheet of reinforced elastomeric fabric. The assembly mechanism 23 is carried by a turntable 30 rotatably mounted on a base plate 31 presented by the frame 4. The reinforcement, e.g., metal wire or cable, is embedded in the ribbon of elastomeric material passing along the lead-in mechanism 22 and runs parallel to the length of the ribbon. When the assembly mechanism 23 is perpendicular to the lead-in table 22, the elastomeric fabric is reinforced at ninety degrees to its length; similarly by rotating the assembly mechanism 23 a desired number of degrees, the fabric is reinforced at an angle to its length as is suitable for the manufacture of bias ply tires.

Operation of the apparatus 21 is commenced when a ribbon of reinforced elastomeric material is presented in predetermined orientation on the lead-in mechanism 22, and a predetermined length of that ribbon is withdrawn therefrom and accurately deposited on the assembly mechanism 23 by the transfer mechanism 20. The guillotine mechanism then severs an elemental strip from the ribbon so deposited on the conveyor belt 28. After the transfer mechanism 20 releases the elemental strip on the belt 28, the position of that elemental strip is accurately indexed so that the successive elemental strip deposited on the belt 28 by the transfer mechanism will be located at the precise degree of lateral juxtaposition desired with respect to the previously deposited elemental strip. The common edges of each successive elemental strip can be joined by a stitcher mechanism (not shown) or can be joined by the edges of each successive strip being formed to present an overlapping edge surface that overlies a similar edge of the previous elemental strip, with the contacting surfaces being made of a material that will adhere to each other, such as uncured rubber.

The general operational concept of the apparatus 21 is substantially the same as the operation of the embodiment disclosed in U.S. Pat. No. 4,087,308, owned by our common assignee, The Steelastic Company, the subject matter of which is hereby incorporated by reference.

With respect now to the present invention, the transfer mechanism 20 comprises three subassemblies: the shuttle mechanism 35; a first movement or elevating means 36 which translates the shuttle mechanism 35 upwardly and downwardly with respect to the lead-in mechanism 22 and assembly mechanism 23 and, a second movement or reciprocating means 38 which translates the shuttle mechanism 35 between the lead-in mechanism 22 and assembly mechanism 23.

The first movement means 36 elevates the shuttle mechanism 35 so that the shuttle 40 can be moved between the lead-in mechanism 22 and assembly mechanism 23. It includes a first support, rigid frame member 41, which is carried by a cantilevered bar 42 presented by the frame 24 and is attached to the bar 42 via angle brackets 43 and 44, and a second support, shuttle support 45 which carries the shuttle 40 in a manner that shall be presented hereinbelow. Double rod, dual acting pneumatic cylinders 46, having a double end rod 47 are carried by frame member 41 and provide a means for moving the support 45 away from and toward the frame member 41.

Control over the movement of support 45 is important since the latter must remain coplanar with respect to the frame member 41 in order to insure precise and constant alignment of the shuttle 35 over the lead-in and assembly mechanisms through countless thousands of cycles. In order to prevent any type of rotation, twin cylinders can be employed. Inasmuch as the construction of the shuttle mechanism is largely of aluminum and plastic material, elevation can easily be accomplished with only one cylinder, while the other cylinder functions as a guide preventing rotation of the shuttle support 45 that might otherwise occur.

Figure 3:
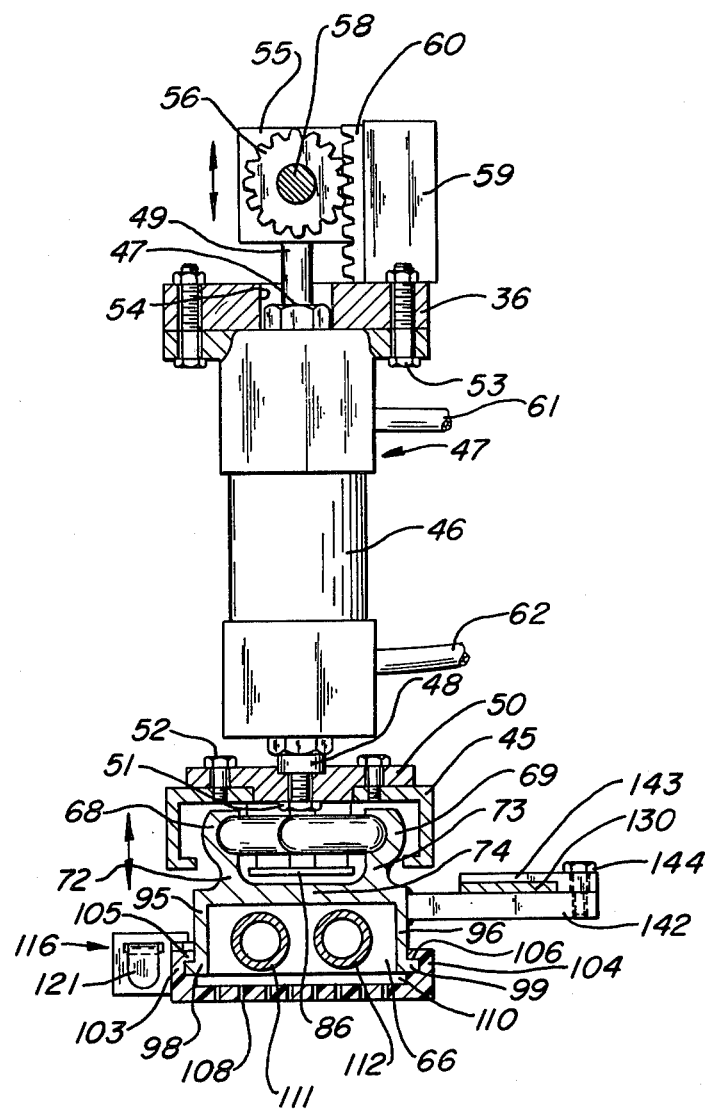
FIG. 3 is a cross-sectional view of one end of the transfer mechanism taken substantially along line 3—3 of FIG. 2.
Figure 9:
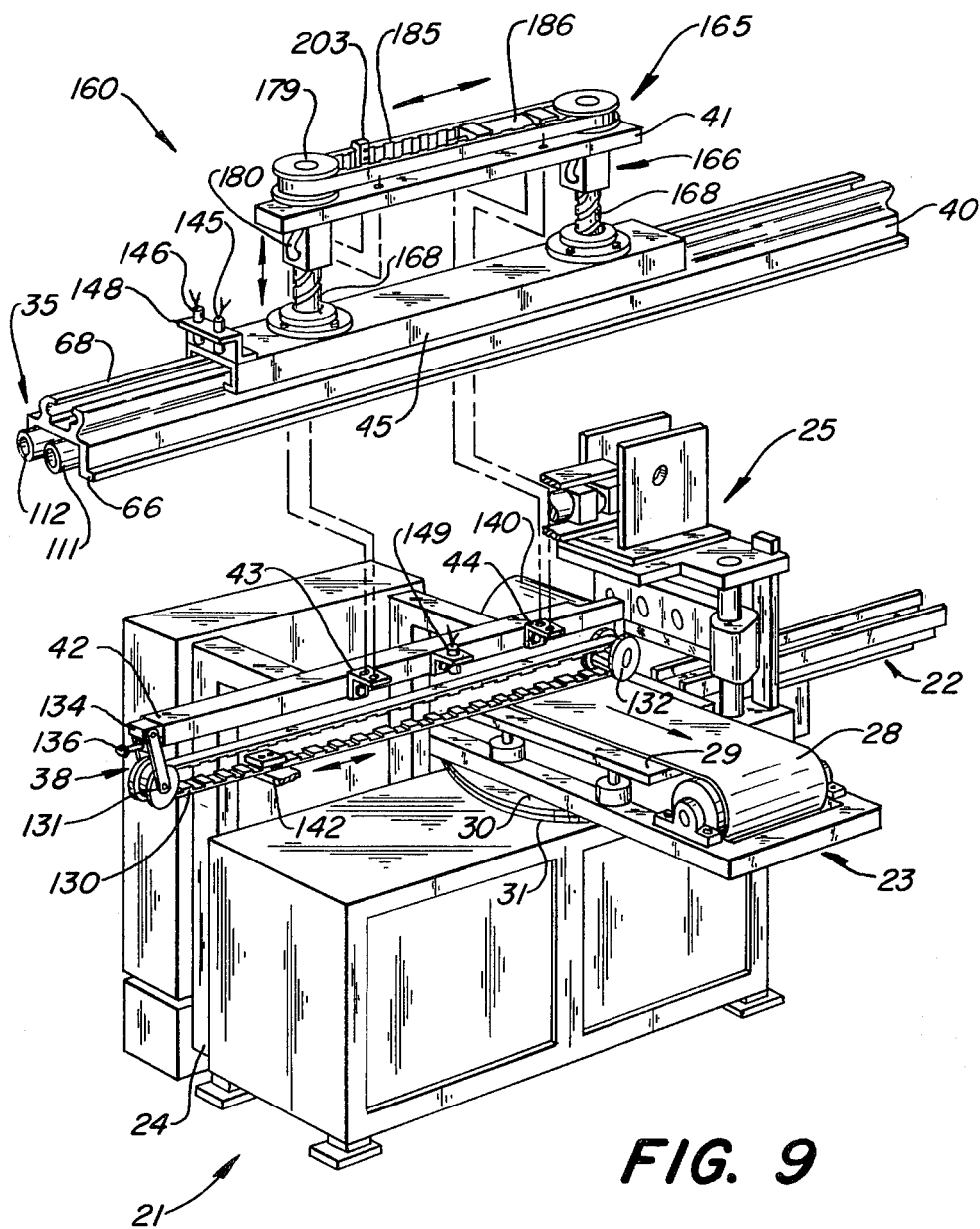
FIG. 9 is an exploded perspective of the main components of another transfer mechanism embodying the concept of the present invention, presenting a different elevating assembly, and is again depicted with a suitable lead-in mechanism and assembly mechanism of an apparatus for making reinforced sheets from reinforced elastomeric ribbon.

The dual end rod of cylinder 46 has a lower and an upper rod 48 and 49 (FIG. 3), respectively. The lower rod 48 provides a female end which is connected to a base plate 50 via bolt fastener 51. The plate 50 is, in turn, affixed to the shuttle support 45 with bolts 52. At the upper end, each cylinder 46 is rigidly affixed to the underside of the frame 41 with bolts 53. With reference to FIG. 3, a bore 54 in frame 41 allows the upper rod 49 to pass through where it is screwed into a pinion block 55 which, in turn, carry a pinion gear 56 on a shaft 58. The shaft 58 carries both pinion gears 56 presented from each cylinder rod 49. A separate rack frame 59, carrying a rack 60, is affixed to the rear of frame member 41, the teeth of the rack meshing with the pinion gears 56.

Air pressure is supplied to the cylinder 46 via supply ducts 61 and 62. Generally, air is supplied continuously during the upstroke causing the lower and upper rod ends 48 and 49 to extend. As the end 49 extends, its pinion gear 56 drives against rack 60 which rotates the shaft 58, driving the pinion gear 56 of the other cylinder and extending the lower and upper rods thereof. In this manner both ends of the shuttle support raise in synchronization allowing the shuttle support 45 to remain parallel with respect to frame member 41, which is necessary for the shuttle 40 to grab a given segment of elastomeric ribbon along its entire length. To return or lower the shuttle support, a short blast of air is provided to the cylinder 46. The cylinder need not be powered during the entire stroke, which is generally less than two or three centimeters, as it will return to its lower position by gravity.

Inasmuch as only one cylinder 46 needs to be activated, the second cylinder could be replaced with a second and separate rod properly housed in bearings to guide vertical movement of the shuttle support 45 at one end. The rod (not shown) could be an extension of the rod 47 and would carry at its upper end 49 a pinion block 54 and pinion gear 56 and be connected to the shuttle support 45 at its lower end 48. As the pinion 56 traveled along the rack 60, the shuttle support 45 would reciprocate at that end in parallel relationship with the opposite end being activated by the cylinder 46. Other embodiments are also possible wherein twin guide rods provide for parallel movement between the shuttle support 45 and frame 41 with a separate cylinder employed to raise and lower the shuttle support. As will be discussed hereinbelow, another alternative elevating means has been provided.

With reference now to FIGS. 3-8, the construction and operation of the shuttle mechanism 35 shall be discussed next. The shuttle mechanism 35 primarily comprises the movable shuttle 40. The shuttle 40 comprises an aluminum profile extrusion presenting an upper raceway 65 which communicates with the shuttle support 45 and a lower open channel 66 which acts to engage the elastomeric ribbon.

The upper raceway 65 comprises mating opposed semicylindrical channels 68 and 69 which terminate with flat upper surfaces 70 and 71, respectively, within the shuttle support 45. Each channel extends from a short leg 72 and 73, respectively, which extends from the upper wall 74 of channel 66. The shuttle support 45 does not contact the flat surfaces 70 and 71 but instead carries a plurality of rollers 75 which engage the raceway 65.

The rollers 75 are clearly depicted in FIGS. 3 and 6-8 and are arranged in pairs. A left or rear bank 76 of rollers 75 engage the raceway 69 and a right or front bank 78 of rollers engage the raceway 68.

The rollers presented in the left bank are all spring biased against the raceway 69. The roller 75 is itself carried by a shaft 79 and is mounted thereon with conveyor bearings 80. Each of the spring biased rollers is mounted in a roller bracket 81. The bracket 81 is freely rotatable around a spacer shaft 82 which passes through a bore 83 in the latter. The shaft 82 is affixed to the underside 84 of shuttle support 45 with a screw fastener 85. At the opposite end of the shaft 82 a roller support plate 86 is provided and is connected thereto with a bolt fastener 88. The roller support plate 86 is one continuous component and serves to provide rigidity to the left and right banks of rollers. Upon close inspection of FIG. 7, it can be seen that the spacer shaft 82 is slightly longer than the height of the roller bracket 81 which maintains a clearance between the shuttle support 45 and support plate 86 allowing the bracket 81 to pivot freely therebetween.

At one end of bracket 81 a tab 89 is provided which connects a small tension spring 90 to a stud 91 in the shuttle support 45. The action of the spring 90 forces the roller 75 against the curved inner surface of channel 69. In order to allow for pivotal movement of the roller brackets 81 an arcuate slot 92 is provided in the underside 84 of support 45 for the head of the shaft 79.

While a plurality of paired rollers 75 are provided and are oppositely biased, the two endmost rollers of the right bank 78 are mounted on a shaft 93 which is constructed on the order of shaft 82 rather than shaft 79 so that the space between support 40 and plate 86 is maintained. These rollers provide a fixed reference orienting the raceway 65 with respect to the shuttle support 40. Spring biasing the remaining rollers 75 facilitates assembly of the shuttle 35 on the shuttle support and provides a constant adjustment of the rollers against the channels 68 and 69.

Use of the rollers 75, carried by the shuttle support 45, which engage the raceway 65 of the shuttle provides excellent support for the latter without requiring an oversized shuttle support. As viewed in FIG. 1, although not generally to scale, the shuttle support 45 need only be about one-half the overall length of the shuttle 40 which again effects a weight reduction allowing for faster vertical movement with less wear. An additional benefit of the support provided by shuttle support 45, the shuttle 40 can be protracted accurately out over the lead-in mechanism 22 without requiring a separate shuttle support over that portion of the apparatus 21, as is discussed in the aforementioned U.S. Pat. No. 4,087,965.

Returning to FIGS. 4 and 5, the open channel 66 includes the upper wall 74 which carries two downwardly extending sidewalls 95 and 96 each of which carry lateral flanges, 98 and 99, respectively, extending perpendicularly and outwardly from sidewalls 95 and 96. A closed rectangular chamber 100 is formed by a foot 101 which engages a portion of the channel 66. The foot 101 forms the bottom wall of the chamber 100 and includes a flat base 102, upwardly extending sidewalls 103 and 104, and inwardly directed lateral flanges, 105 and 106, respectively. The flanges 105 and 106 register against lateral flanges 98 and 99 of the channel 66 and enclose the chamber 100.

The foot 101 is preferably made from plastic such as PVC so that the uncured elastomeric ribbon does not stick to it and also because it is lightweight. The length of the foot is sufficient to accommodate the longest length of ribbon to be withdrawn from the lead-in table in one pass. Accordingly, this latter dimension is also just slightly less than the width of the assembly mechanism conveyor belt 28. The shuttle 35 is somewhat longer than the foot 101 in order to provide further necessary structure.

The foot is rigidly fixed to the shuttle with a plurality of recessed screws, not shown. At the farthest end, i.e., near the guillotine mechanism 25 as viewed in FIG. 1, the foot provides an end wall (not shown) which closes the channel 66 at that end. It can be noted that the flat base 102 carries a plurality of orifices 108 for the passage of air. As will be explained subsequently, reduced air pressure within chamber 100 will provide a vacuum pickup through the foot 101 against elastomeric ribbon as a means to grasp and transport the latter. Fitted within the chamber 100 at the other end is a movable endblock 109 which is conneated to a msladej plaie 110. slider plate 110 rests against the flat base 102 and is slidable between it and lateral flanges 98 and 99 of the channel 66.

Twin conduits 111 and 112 are connected to an air duct 113 from a supply of air at subatmospheric or superatmospheric pressure. The conduits 111 and 112 are rigidly fixed within the channel 66 via support block 114 and the end block 109 and pass well into the enclosed chamber 100. Air withdrawn through the conduits 111 and 112 (subatmospheric pressure) creates a vacuum effect within chamber 100, as depicted in FIG. 5, sufficient to draw a length of ribbon against the foot 101 and pull it from the lead-in mechanism 22 to the assembly mechanism 23 which requires a vertical movement, as previously described, and a reciprocal translation. Superatmospheric pressure can also be applied to aid separation between the foot 101 and elastomeric ribbon, should that become necessary. However, by the use of a PVC material, most uncured ribbon will fall away once the vacuum is released.

The length of ribbon that can be grasped and withdrawn for one cycle will vary depending upon the angle selected between the assembly mechanism 23 and lead-in mechanism 22 and the width of the belt or ply being manufactured. Whenever radial ply stock is made or bias ply of less width than that of the conveyor belt 28, it is desirable to limit the surface area of the foot 102 through which the vacuum is drawn which not only limits the amount of air which is to flow but also cuts down on the noise otherwise attendant the rush of air through the open orifices.

This control is effected by the slider plate 110 and end block 109 which can be moved in unison into the chamber 100, to a point where the leading edge 115 of the slider 110 defines a vacuum passageway as long as the ribbon segment desired. In order to vary the length of the passageway, an adjustable lock 116 is provided which comprises a support saddle 118 which cradles conduits 111 and 112, a pawl box 119 containing a pawl mechanism (not shown) to engage the teeth of a rack 120 affixed to the flange 98. The pawl is spring loaded and is disengaged from the rack 120 by depressing a latch 121 at the side of box 119.

The support saddle is slidable along conduits 111 and 112 and is provided with twin control rods 122 and 123 which are rigidly affixed to the slidable end block 109. As should now be evident, by sliding the lock 116 toward the air supply duct 113 the length of the vacuum passageway or chamber 100 is increased. Conversely, when shorter ribbon sections are to be moved, the lock 116 is slid toward the foot 101 which decreases the number of exposed orifices and the length of the vacuum passageway.

Figure 2:
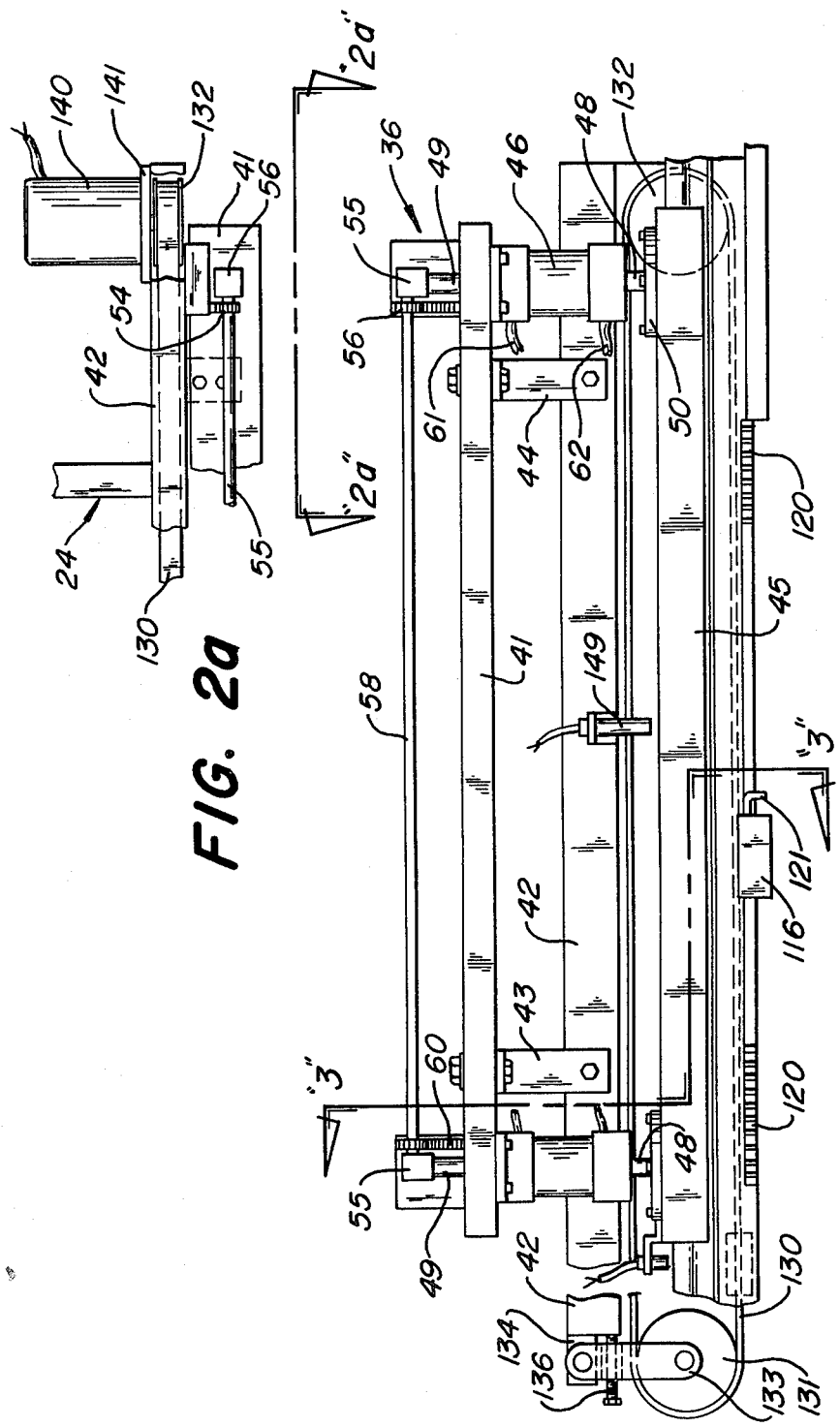
FIG. 2 is a frontal elevation of the transfer mechanism depicting the shuttle mechanism, elevating means and reciprocating means.

Turning now to FIGS. 1–2A the construction and operation of the second movement means 38 shall be discussed. The second movement or reciprocating means 38 transposes the shuttle mechanism back and forth between a fixed lateral position over the assembly mechanism 23 and lead-in mechanism 22. It includes a toothed drive belt 130 which is reeved around a notched timing pulley 131 and a notched drive pulley 132. The pulley 131 is rotatably carried by a bracket 133 pivotally connected to a lug 134 at the end of cantilevered bar 42. The bracket 133 carries a center bar 135 which threadably engages an adjustment screw 136 which registers against the end of bar 42 beneath the lug 134. Turning the screw 136 in toward the bar 42 pivots the bracket 133 and pulley 131 away, in effect tightening the tension on belt 130.

The drive pulley 132 is suitably affixed to the output shaft of a stepper motor 140 which incrementally moves the drive belt 130 in a clockwise or counterclockwise direction as necessary. Stepper motor 140 is mounted on a bracket 141 which is affixed to the cantilevered bar 42. The drive belt 130 is attached to the movable shuttle 40 by virtue of a belt mounting tab 142 (FIG. 3) welded or otherwise suitably affixed to the sidewall 96 of channel 66. A toothed cap 143 is affixed to the tab 142 via bolt fasteners 144 the cap having a tooth that registers with one of the notches in the belt 130 to provide non-slip movement by the shuttle 40 with the belt.

Control over the direction of motor rotation is provided with two electric eye or other suitable sensors 145 and 146. As best seen in FIG. 1, these sensors are affixed to a bracket 148 connected to one end of shuttle support 45. One sensor is provided to signal whether the shuttle 40 is over the assembly mechanism 23 or the lead-in mechanism 22 and hence, controls the direction of next movement of the shuttle, while the other sensor controls the amount of travel so that the shuttle 40 can return to and descend onto the precise location for each cycle. A third sensor 149 is carried by a bracket 150 from bar 42 and determines whether the shuttle support 45 is up or down. Obviously, whenever the support 45 is down the cylinder 46 must next be activated to raise it and vice-versa.

Having described the various component parts of the transfer mechanism 20 and the operation of each, the operation of the complete mechanism 20 should be understood to be as follows. Assuming a starting position of the shuttle as up and over the assembly mechanism 23, the drive belt 130 is activated to rotate counterclockwise as viewed from the front of apparatus 21. This passes the shuttle 40 a given distance through the shuttle support 45 to a position where the shuttle foot 101 is over the lead-in mechanism 22. At this location the shuttle ceases its lateral extension and cylinder 46 is briefly actuated allowing the shuttle support and shuttle to descend onto the continuous strip of elastomeric ribbon being fed onto the lead-in mechanism.

As the shuttle foot 101 contacts the ribbon, subatmospheric pressure is applied to the conduits 111 and 112 and the cylinder 46 is actuated to raise the shuttle support 45. In turn, a segment of ribbon gripped by the foot 101 is raised from the lead-in mechanism 22. Next, the drive belt 130 is rotated clockwise which carries the shuttle 40 past the guillotine mechanism 25 to a predetermined location over the conveyor belt 28. Retraction of the shuttle 40 then ceases, cylinder 46 is again briefly actuated and the shuttle support is lowered depositing the strip of withdrawn ribbon onto the belt 28.

At this point the guillotine mechanism 25 is activated which provides a powered knife 151 blade against the ribbon extended between the assembly mechanism 23 and the lead-in mechanism 22. Once the ribbon has been severed, the cylinder 46 is again activated raising the shuttle support 45 during which time the knife is raised, providing an opening through which the shuttle 40 will subsequently pass, and the conveyor belt is indexed forward a predetermined length so as to receive a new segment of ribbon.

This completes the operation of a single cycle which is thereafter repeated until either the length of reinforced ribbon fed to the lead-in mechanism is exhausted or the length of reinforced fabric manufactured and taken up from the assembly mechanism is satisfactory. The transfer mechanism cycle is fast enough, e.g., 30 to 40 cycles per minute, to keep pace with the other cyclic, feeding and wind-up processes associated with the apparatus 21.

FIGS. 9–15 represent an alternative embodiment of transfer mechanism indicated generally by the numeral 160. Transfer mechanism 160 is utilized with the same apparatus 21 discussed hereinabove and also employs the shuttle mechanism 35 and reciprocating means 38. Inasmuch as the construction and operation of these components have previously been described a detailed discussion thereof shall not be repeated. The transfer mechanism 160 basically differs from mechanism 20 depicted in FIG. 1 by employing a different elevating means 165.

Figure 12:
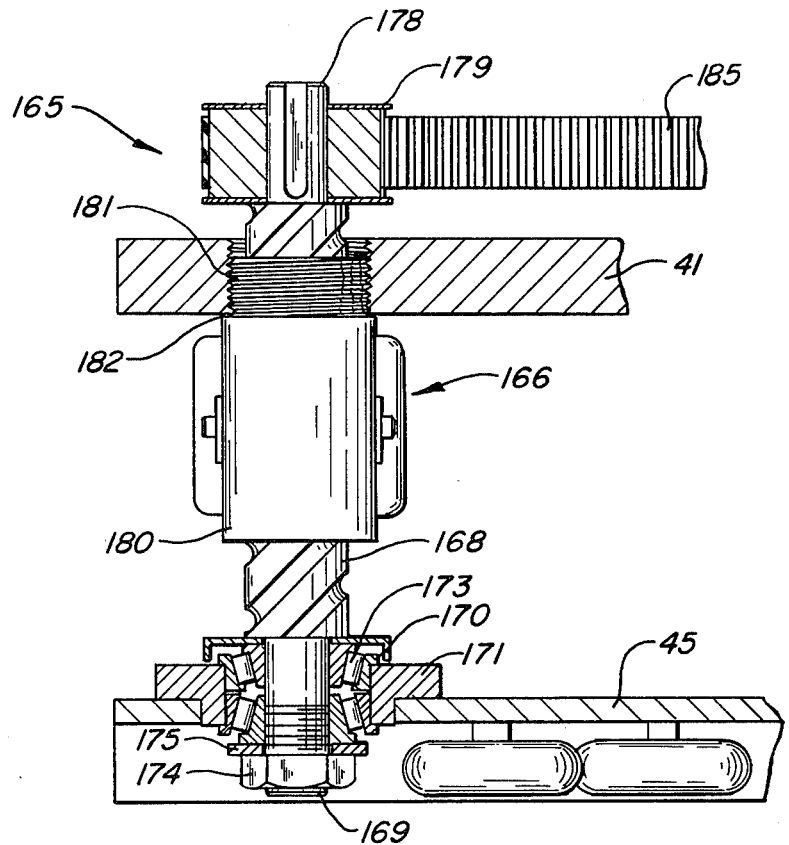
FIG. 12 is a frontal elevation of one end of the transfer mechanism of FIG. 9, totally in section, taken substantially along line 12—12 of FIG. 11.
Figure 13:
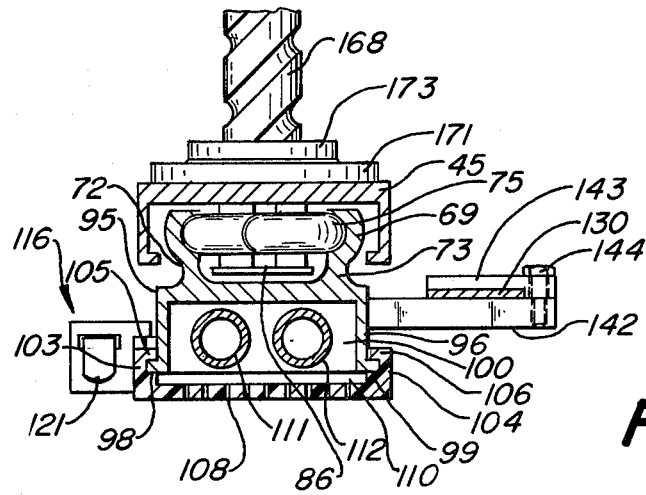
FIG. 13 is a side elevation of the lower part of the transfer mechanism of FIG. 9, partially in section, taken substantially along line 13—13 of FIG. 10.

Although the elevating means 165 employs the rigid frame member 41, carried by bar 42, and the shuttle support 45 of transfer mechanism 20, it does not employ the pneumatic cylinders 46 and associated elements thereof. In lieu of cylinders 46, the elevating means 165 employs a pair of ball screws 166 each of which provides a screw shaft 168. With reference to FIG. 12, the lower end 169 of the screw shaft is threaded and passes through shuttle support 45 for rotation therein. A double row of tapered roller bearings 170 are provided in a bearing housing 171 which is connected to the upper surface of shuttle support 45 via screw fasteners 172. A dust cover 173 protects the bearing 170, while a nut and washer 174 and 175 affixes the bearing to the ball screw shaft end 169.

The upper end 176 of ball screw shaft 168 passes through the rigid frame member 41 and provides a cylindrical shaft 178 to which is keyed a notched timing pulley 179. The bearing housing 180 of ball screw 166 is provided with a threaded lead 181 which rigidly engages the frame 41 as at 182 non-rotatably fixing the ball screw assembly 166 to the frame 41. In this manner the bearing housing remains stationary while the ball screw shaft 168 rotates therethrough or up and down with respect thereto as viewed in the drawings. Inasmuch as the construction and mounting of both ball screws 166 are identical, the description of one shall suffice.

A notched timing belt 185 is reeved around both timing pulleys 179 so that they rotate in unison. The rotation of the ball screw shafts 168, in turn, raises the shuttle support 45 and shuttle 40 in the manner described hereinabove when the pneumatic cylinder 46 was actuated, with total alignment being maintained. In order to drive the timing belt 185, a double-acting pneumatic cylinder 186 is employed which is rigidly mounted on frame 41. The cylinder 186 provides a rod 188 which communicates with a belt driver 189 which reciprocates within guide and mounting assembly 190.

The guide assembly 190 comprises two mounting blocks 191 and 192 which are firmly affixed to the top of frame 41 in front of the cylinder 186. Twin guide rods 193 and 194 separate the blocks 191 and 192 and are affixed thereto providing a track upon which the belt driver 189 is reciprocated. The cylinder rod 188 passes freely through a bore provided in the first mounting block 191.

The belt driver 189 includes a C-shaped frame member 195 having a base 196 and opposed sidewalls 198 and 199. The sidewalls 198 and 199 are provided with suitable bores so that the frame member 195 can slide freely along twin guide rods 193 and 194. A separate bore is also provided in sidewall 198 through which the cylinder rod 188 can freely pass. The end of rod 188 is threaded into the opposite sidewall 199 so that movement of the rod reciprocates the belt driver 189 along the guide rods. Finally, the belt driving element 200 is provided between the sidewalls 198 and 199. Twin guide rods 193 and 194 as well as the cylinder rod 188 pass through separate bores in the element and compression springs 201 and 202 are provided on the rod separating the element 200 from the sidewalls 198 and 199.

The element 200 provides an end having teeth which engage the notches in the timing belt 185. A cap 203 is attached to the element 200 with a bolt fastener 204 so that extension or retraction of the cylinder rod 188 rotates the belt 185 counterclockwise and clockwise, respectively. Abrupt acceleration and deacceleration of the driving element 200 is taken upon the springs 201 and 202 thus providing smooth operation and long life for the belt 185 and associated elements of the elevating means 165.

As briefly stated hereinabove, the operation of the transfer mechanism 160 is comparable to that of the transfer mechanism 20 in conjunction with the apparatus 21 and, therefore, need not be repeated. From the foregoing description of the elevating means 165, its operation to raise and lower the shuttle support 45 should be clear.

Thus, it can be seen that the disclosed invention carries out the objects set forth hereinabove. By employing either of the transfer mechanisms described herein with a conventional ply fabricating apparatus, such as set forth in U.S. Pat. No. 4,087,308, uniformly reinforced elastomeric fabric can be readily obtained. Owing to the relative simplicity of the transfer mechanisms set forth herein, it is evident that the manufacture of either will be less costly than existing systems where more drive and movement assemblies are employed. As will be apparent to those skilled in the art, equivalent mechanical or electrical components or electrical and fluid drive means can be employed in lieu of the specific components discussed in the foregoing embodiments. Such variations can be determined without departing from the spirit of the invention herein disclosed and described. Moreover, the scope of the invention shall include all modifications and variations that fall within the scope of the attached claims.

We claim:

1. A transfer mechanism for the movement of elastomeric ribbon between a first and second mechanism of a ply fabrication apparatus comprising:
    shuttle means for selectively engaging the ribbon and including:
        a raceway presenting opposed flanges; and
        channel means projecting downwardly from said raceway, said raceway and channel means defining a movable shuttle; first movement means for translation of said shuttle upwardly and downwardly with respect to said first and second mechanisms, said first movement means being located over one of said two mechanisms and including:
    first support means rigidly attached to said apparatus;
    second support means for mounting said shuttle and having an overall length less than the length of said shuttle;
    roller means rotatably carried by said second support means and engageable with said opposed flanges of said raceway for parallel protraction and retraction of said shuttle therealong whereby said shuttle can be protracted from said first mechanism to said second mechanism without direct support over said second mechanism;
    first rod means;
    actuating means for moving said first rod means, one end of said first rod means being connected to one of said support means, said actuating means being connected to the other of said support means, and the other end of said first rod means being movable with respect to the other of said support means to which said actuating means is connected;
    first intermeshing rack and gear means connected to one end of said first rod means;
    shaft means rotatably connected to said first gear means;
    second intermeshing rack and gear means said gear means being affixed on said shaft means and rotatable therewith; and
    second rod means connected to said second rack and gear means at one end and being connected at the other end to the support means to which said first rod means is connected whereby said first and second rod means are protracted and retracted in unison to move one of said support means toward and away from the other of said support means in continuous parallel alignment therewith; and
    second movement means for translation of said shuttle between said first and second mechanisms.

2. A transfer mechanism for the movement of elastomeric ribbon between a first and second mechanism of a ply fabrication apparatus comprising:
    shuttle means for selectively engaging the ribbon and including:
        a raceway presenting opposed flanges; and
        channel means projecting downwardly from said raceway, said raceway and channel means defining a movable shuttle;
    first movement means for translation of said shuttle upwardly and downwardly with respect to said first and second mechanisms, said first movement means being located over one of said two mechanisms and including:
        first support means rigidly attached to said apparatus;
        second support means for mounting said shuttle and having an overall length less than the length of said shuttle;
        roller means rotatably carried by said second support means and engageable with said opposed flanges of said raceway for parallel protraction and retraction of said shuttle therealong whereby said shuttle can be protracted from said first mechanism to said second mechanism without direct support over said second mechanism;
        a pair of ball screws each having a housing affixed to one of said support means and a screw affixed to the other of said support means;
        pulley means keyed to each said screw;
        belt means reeved around said pulleys;
        means for incrementally driving said belt means whereby said ball screws are rotated sufficiently against their housings that one of said support means is protracted and retracted relative to the other of said support means, said first and second support means remaining parallel to each other at all times; and
    second movement means for translation of said shuttle between said first and second mechanisms.

3. A transfer mechanism, as set forth in claims 1 or 2, wherein said movable shuttle means further includes:
    foot means carried by a portion of said channel means providing an enclosed chamber and having a plurality of orifices for communication of air between said enclosed chamber and the atmosphere;
    slider plate means interposed between said foot means and said channel means for selectively exposing different orifices in said foot whereby the length of said enclosed chamber through which air passes relative to said shuttle can be varied; and means for providing air selectively to said enclosed chamber at pressures ranging between subatmospheric to superatmospheric.

4. A transfer mechanism, as set forth in claim 3, further comprising:

lock means partially carried outside of said channel means and partially extending therewithin;

end block means attached to said slider plate means, slidably engaging said enclosed chamber and forming a movable end wall thereof;

means connecting said lock means to said end block means whereby movement of said lock means relative to said channel means alters the length of said enclosed chamber; and means engaging said lock means and carried by said channel means, providing a given section of said enclosed chamber to grasp and hold selectively a desired length of elastomeric ribbon.

5. A transfer mechanism, as set forth in claims 1 or 2, wherein said second movement means comprises:

a continuous drive element provided from the apparatus;

means for driving said element; and connector means provided for linking said continuous drive element to said shuttle whereby said shuttle is translated laterally of said second support means.

6. A transfer mechanism, as set forth in claim 5, wherein said drive element comprises a toothed timing belt and said second movement means further comprises:

means for adjusting the tension of said belt.

7. A transfer mechanism, as set forth in claim 6, further comprising:

first sensor means for determining the location of said shuttle relative to said first and second mechanism of the apparatus; and second sensor means for determining the position of said second support means relative to said first sensor means.

8. A transfer mechanism, as set forth in claim 1, wherein:

said first support means is located above said second support means;

said actuating means is affixed to said first support means; and said first rod means and said actuating means comprise a double end drive cylinder.

9. A transfer mechanism, as set forth in claim 8, wherein said first and second intermeshing rack and gear means are provided on said first support means.

10. A transfer mechanism, as set forth in claim 9, wherein said second rod means is presented with second actuation means comprising a second double end drive cylinder.

11. A transfer mechanism, as set forth in claim 10, wherein only one of said double end drive cylinders is activated.

12. A transfer mechanism, as set forth in claim 2, wherein:

said first support means is located above said second support means;

said pair of ball screw means are affixed to said first support means;

said screws are rotatably affixed to said second support means and terminate above said first support means; and said pulley means are keyed to said screws above said first support means.

13. A transfer mechanism, as set forth in claim 12, wherein said means for incrementally driving said belt means is carried by said first support means and comprises:

cylinder means having a drive rod;

a guide assembly carried by said first support means, said drive rod being movable with respect thereto; and driver means slidably moved within said guide assembly by said drive rod.

14. A transfer mechanism, as set forth in claim 13, wherein:

said belt means comprises a toothed timing belt; and said driver means carries a drive element selectively engageable with said belt, said drive element being movable within said driver means and moved therewith.

15. A transfer mechanism, as set forth in claim 14, wherein spring means are carried on said drive rod spacing said drive element within said driver means.

* * * * *